US 10,429,962 B2

(12) United States Patent
Oda et al.

(10) Patent No.: US 10,429,962 B2
(45) Date of Patent: Oct. 1, 2019

(54) POSITION INDICATOR

(71) Applicant: Wacom Co., Ltd., Saitama (JP)

(72) Inventors: Yasuo Oda, Saitama (JP); Susumu Yamada, Gunma (JP)

(73) Assignee: WACON CO., LTD., Saitama (JP)

( * ) Notice: Subject to any disclaimer, the term of this patent is extended or adjusted under 35 U.S.C. 154(b) by 174 days.

(21) Appl. No.: 15/280,519

(22) Filed: Sep. 29, 2016

(65) Prior Publication Data

US 2017/0102789 A1  Apr. 13, 2017

(30) Foreign Application Priority Data

Oct. 9, 2015 (JP) .................. 2015-201374

(51) Int. Cl.
*G06F 3/0354* (2013.01)
*G06F 3/038* (2013.01)
*G06F 3/041* (2006.01)
*G06F 3/044* (2006.01)
*G06F 3/045* (2006.01)

(52) U.S. Cl.
CPC ........ *G06F 3/0383* (2013.01); *G06F 3/03545* (2013.01); *G06F 3/044* (2013.01); *G06F 3/045* (2013.01); *G06F 3/0416* (2013.01); *G06F 2203/04106* (2013.01); *G06F 2203/04111* (2013.01)

(58) Field of Classification Search
None
See application file for complete search history.

(56) References Cited

U.S. PATENT DOCUMENTS

| 4,567,565 A * | 1/1986 | Haselby ................ G01D 15/22 318/571 |
| 8,766,954 B2 | 7/2014 | Vuppu et al. |
| 2012/0259830 A1 * | 10/2012 | Bennett ............. G06F 17/30864 707/706 |

FOREIGN PATENT DOCUMENTS

JP  4683505 B1  5/2011

* cited by examiner

*Primary Examiner* — Andre L Matthews
(74) *Attorney, Agent, or Firm* — Seed IP Law Group LLP

(57) ABSTRACT

A position indicator has a first electrode, an inverting amplifier and electrical isolation circuitry. The first electrode, in operation, receives an input signal from a capacitive touch panel and transmits a reference signal. The inverting amplifier has an input coupled to the first electrode, and, in operation, inverts and amplifies the input signal. The electrical isolation circuitry has an input coupled to an output of the inverting amplifier, and, in operation, generates the reference signal based on the inverted and amplified input signal.

9 Claims, 4 Drawing Sheets

POSITION INDICATOR

BACKGROUND

Technical Field

The present disclosure relates to a position indicator, and particularly to a position indicator used as an input pen for a capacitive touch panel.

Description of the Related Art

Tablet terminals that have been popular in recent years generally use a capacitive touch panel as a touch panel for receiving touch input. The capacitive touch panel typically has a configuration in which a plurality of X-electrodes each extending in a Y-direction and a plurality of Y-electrodes each extending in an X-direction are arranged so as to intersect. The capacitive touch panel is for example configured to repeat, for all of the Y-electrodes in order, processing of a determined input signal to a Y-electrode and extracting this signal from each X-electrode in order. When a finger approaches the touch panel, a capacitance occurs between the finger and an X-electrode and a Y-electrode in the vicinity of the finger, and a human body absorbs a current through this capacitance. The amplitude of a signal extracted from the X-electrode is therefore decreased. The capacitive touch panel is configured to detect the position of the finger by detecting the change in the amplitude.

The capacitive touch panel is basically intended for finger detection. However, a large number of electronic pens compatible with capacitive touch panels have been sold in recent years. U.S. Pat. No. 8,766,954 and Japanese Patent No. 4683505 (hereinafter referred to as Patent Documents 1 and 2) disclose examples of electronic pens of this kind. As is shown also in Patent Documents 1 and 2, in a case where an electronic pen is used on a capacitive touch panel, a low capacitance occurring between the electronic pen and electrodes within the touch panel may become a problem. Formerly, in order to solve this problem, a pen point of the electronic pen has been made thick to increase an area of contact with the touch panel. However, the thick pen point is not suitable for drawing a thin line. There has accordingly been a desire to develop an electronic pen that can ensure a high capacitance between the electronic pen and electrodes within the touch panel while having a thin pen point. Patent Documents 1 and 2 disclose examples of such electronic pens.

FIG. 6 is a diagram depicting an example of an electronic pen (position indicator) that may facilitate providing a high capacitance between the electronic pen and electrodes within a touch panel while having a thin pen point. As depicted in FIG. 6, an electronic pen 101 according to the present example includes, as a configuration viewed from the outside, a cylindrical casing 102, a pen point portion 103 disposed at a tip of the casing 102, and a base portion 104 having the shape of a circular cone which base portion is disposed between the pen point portion 103 and the casing 102, and is configured to surround the periphery of the pen point portion 103. The pen point portion 103 is formed by a conductor. The pen point portion 103 is formed so as to be sufficiently thin. Hence, this electronic pen 101 is also suitable for drawing a thin line.

A circuit 105 is formed within the electronic pen 101. As depicted in FIG. 6, the circuit 105 includes resistance elements 150 and 151, inverter circuits 152 and 153, a power supply 160, and power supply wirings GH and GL. The resistance element 150 has one end coupled to the pen point portion 103, and has another end coupled to an input terminal of the inverter circuit 152. The resistance element 151 is disposed in parallel with the inverter circuit 152. An output terminal of the inverter circuit 152 is coupled to an input terminal of the inverter circuit 153. An output terminal of the inverter circuit 153 is coupled to the casing 102. The casing 102 is grounded through a human body of a human holding the electronic pen 101.

The power supply wiring GH is commonly coupled to a high-level side terminal of the power supply 160 and respective high-level side power supply terminals of the inverter circuits 152 and 153. In addition, the power supply wiring GL is commonly coupled to a low-level side terminal of the power supply 160 and respective low-level side power supply terminals of the inverter circuits 152 and 153.

When the pen point portion 103 approaches a touch panel, not depicted in FIG. 6, a signal S1 is supplied from the touch panel to the pen point portion 103, as depicted in FIG. 6. This signal S1 is inverted by the inverter circuit 152, and thereafter supplied to the inverter circuit 153. The inverter circuit 153 tries to further invert and output the thus supplied inverted signal of the signal S1. However, the inverter circuit 153 cannot perform the output because the output terminal is grounded, and as a reaction, the reference potential and ground potential of the circuit 105 swing. This swing causes a signal S2 having a polarity equal to that of the inverted signal of the signal S1 to be generated at various positions of the circuit 105, as depicted in FIG. 6. When the thus generated signal S2 is radiated to the outside through the pen point portion 103 and reaches the touch panel, a larger amount of signal appears to have been absorbed by the electronic pen 101 as viewed from the touch panel. This is equivalent to an increase in capacitance between the electronic pen and electrodes within the touch panel. Thus, according to the configuration depicted in FIG. 6, it is possible to provide the electronic pen 101 that has a high capacitance between the electronic pen 101 and electrodes within the touch panel though the pen point portion 103 is formed so as to be thin, and which electronic pen can therefore be suitably used as an input pen for a capacitive touch panel.

However, the configuration of such an electronic pen 101 has a problem of consuming a large amount of power and a problem of a possibility of radiating an unnecessary signal to the outside through the casing 102. That is, the generation of the signal S2 at various positions of the circuit 105 is equal to driving all of the stray parasitic capacitances in small amounts at the various positions of the circuit 105. Hence, the inverter circuit 153 needs to be supplied with a high power in order to radiate the signal S2 of a sufficient strength from the pen point portion 103 to the outside. As a result, the power consumption of the electronic pen 101 is increased. In addition, when the electronic pen 101 is not held by a human, the casing 102 is in an electrically floating state. When the output signal of the inverter circuit 153 is supplied to the casing 102 in the electrically floating state, the output signal is radiated to the outside through the casing 102.

BRIEF SUMMARY

In an embodiment, a position indicator is provided that may be suitably used as an input pen for a capacitive touch panel even when a pen point portion is formed so as to be thin, and which facilitates reducing power consumption and unnecessary signal radiation.

In an embodiment, a position indicator for use with an electronic apparatus is provided, the electronic apparatus detecting an indicated position by detecting a change in capacitance, the position indicator including: a first electrode configured to receive a first signal from the electronic apparatus; an inverting amplifier configured to invert and amplify an input signal, and output the inverted and amplified signal; an isolation circuit having an input terminal and an output terminal insulated from each other; a first low-level side power supply wiring configured to supply a first low-level side power supply potential to the isolation circuit; a first high-level side power supply wiring configured to supply a first high-level side power supply potential to the isolation circuit; a second low-level side power supply wiring configured to supply a second low-level side power supply potential to the inverting amplifier; a second high-level side power supply wiring configured to supply a second high-level side power supply potential to the inverting amplifier; a first power supply circuit coupled between the first low-level side power supply wiring and the first high-level side power supply wiring; a second power supply circuit coupled between the second low-level side power supply wiring and the second high-level side power supply wiring; and a casing having a conductive region formed in at least part of the casing; the first low-level side power supply wiring being coupled to the conductive region of the casing, and the second low-level side power supply wiring being supplied with a reference signal, the reference signal being a signal based on the first signal passed through the inverting amplifier and the isolation circuit after being received by the first electrode, and the reference signal having a polarity opposite from a polarity of the first signal.

In an embodiment, the reference signal having the polarity opposite from the polarity of the first signal is supplied to the second low-level side power supply wiring. Thus, due to virtual short-circuiting of the inverting amplifier, the inverted signal of the first signal is radiated from an input terminal of the inverting amplifier through the first electrode. This is equivalent to providing a high capacitance between electrodes within the touch panel and the first electrode as compared with a case where there is no such radiation. Hence, the position indicator according to an embodiment may be suitably used as an input pen for a capacitive touch panel even when a pen point portion is formed so as to be thin.

In addition, in an embodiment, it is not necessary to swing the potential of the whole circuit in a process of radiating the inverted signal of the first signal. Thus, a reference signal output circuit does not need to be supplied with a particularly high power. Power consumption may therefore be reduced as compared with the position indicator according to the background art.

In an embodiment, the reference signal is supplied to the second low-level side power supply wiring. However, because the isolation circuit isolates the first and second low-level side power supply wirings from each other, the first low-level side power supply wiring may be grounded by being coupled to the casing. Hence, even when the position indicator is not held by a human and the casing is electrically floating, the radiation of an unnecessary signal from the casing to the outside as in the case of the position indicator according to the background art may be prevented.

In an embodiment, a position indicator comprises: a first electrode, which, in operation, receives a first signal; an inverting amplifier coupled to the first electrode, wherein the inverting amplifier, in operation, inverts and amplifies an input signal, the input signal being based on the first signal, and outputs the inverted and amplified signal; an isolation circuit having an input terminal and an output terminal insulated from each other in the isolation circuit, the input terminal of the isolation circuit being coupled to an output of the inverting amplifier; a first low-level side power supply wiring to supply a first low-level side power supply potential to the isolation circuit; a first high-level side power supply wiring to supply a first high-level side power supply potential to the isolation circuit; a second low-level side power supply wiring to supply a second low-level side power supply potential to the inverting amplifier, the second low-level side power supply wiring being coupled to the output terminal of the inverting amplifier; a second high-level side power supply wiring to supply a second high-level side power supply potential to the inverting amplifier; a first power supply circuit coupled between the first low-level side power supply wiring and the first high-level side power supply wiring; a second power supply circuit coupled between the second low-level side power supply wiring and the second high-level side power supply wiring; and a casing having a conductive region, the first low-level side power supply wiring being coupled to the conductive region of the casing. In an embodiment, in operation, the second low-level side power supply wiring is supplied with a reference signal, the reference signal being based on the first signal passed through the inverting amplifier and the isolation circuit after being received by the first electrode, and the reference signal having a polarity opposite from a polarity of the first signal. In an embodiment, the position indicator comprises: a bias circuit coupled to the second low-level side power supply wiring, wherein the inverting amplifier includes an operational amplifier having an inverting input terminal coupled to the first electrode, a non-inverting input terminal coupled to an output of the bias circuit, and an output terminal, a first resistance element coupled between the first electrode and the inverting input terminal, and a second resistance element coupled between the output terminal and the inverting input terminal. In an embodiment, the isolation circuit comprises a photo-coupler including: a first high-level side power supply terminal coupled to the output terminal of the isolation circuit; a second high-level side power supply terminal; a low-level side power supply terminal; a light emitting diode coupled between the second high-level side power supply terminal and the input terminal; and a phototransistor coupled between the first high-level side power supply terminal and the low-level side power supply terminal, the first low-level side power supply wiring is coupled to the low-level side power supply terminal, the first high-level side power supply wiring is coupled to the first high-level side power supply terminal, and the second high-level side power supply wiring is coupled to the second high-level side power supply terminal. In an embodiment, the position indicator comprises: a first inverter circuit coupled between the output of the inverting amplifier and the input terminal of the isolation circuit; and a second inverter circuit coupled between the output terminal of the isolation circuit and the second low-level side power supply wiring. In an embodiment, the position indicator comprises: a second electrode positioned adjacent to the first electrode and coupled to the second low-level side power supply wiring. In an embodiment, the position indicator comprises: a pen point portion disposed at a tip of the casing; and a base portion having a shape of a circular cone, the base portion being disposed between the pen point portion and the casing, and being sized and shaped to surround a periphery of the pen point portion, wherein the pen point portion includes the first electrode, and the base portion includes the second electrode. In an embodiment, the first power supply circuit comprises a first battery, and the second power supply circuit comprises a second battery different from the first battery. In an embodiment, the first power supply circuit comprises a battery, and the second power supply circuit comprises an isolated direct current-to-direct current converter to output power supplied from the battery via a transformer. In an embodiment, the position indicator comprises: a battery; and a transformer, wherein the first power supply circuit comprises a first isolated direct current-to-direct current converter to output power supplied from the battery via a first winding of the transformer, and the second power supply circuit comprises a second isolated direct current-to-direct current converter configured to output the power supplied from the battery via a second winding of the transformer.

In an embodiment, a position indicator comprises: a first electrode, which, in operation, receives an input signal and transmits a reference signal; an inverting amplifier having an input coupled to the first electrode, wherein the inverting amplifier, in operation, inverts and amplifies the input signal; and electrical isolation circuitry having an input coupled to an output of the inverting amplifier, wherein the electrical isolation circuitry, in operation, generates the reference signal based on the inverted and amplified input signal. In an embodiment, the inverting amplifier comprises: an operational amplifier having an inverting input terminal, a non-inverting input terminal and an output terminal; a first resistance element coupled between the first electrode and the inverting input terminal; and a second resistance element coupled between the output terminal and the inverting input terminal. In an embodiment, the position indicator comprises: a biasing circuit coupled between an output of the electrical isolation circuitry and the non-inverting input terminal of the operational amplifier. In an embodiment, the electrical isolation circuitry comprises: a photo-coupler; a first inverter coupled between the output terminal of the operational amplifier and an input of the photo-coupler; and a second inverter having an input coupled to an output of the photo-coupler and an output coupled to an input of the biasing circuit. In an embodiment, the position indicator comprises: a first power supply bus coupled to a phototransistor of the photo-coupler and the second inverter; and a second power supply bus coupled to a light emitting diode of the photo-coupler, the first inverter and the inverting amplifier, wherein an output of the second inverter is coupled to a low-side of the second power supply bus and a second electrode in a body of the position indicator is coupled to a low-side of the first power supply bus. In an embodiment, the position indicator comprises: a third electrode coupled to the low-side of the second power supply bus. In an embodiment, the electrical isolation circuitry comprises: a photo-coupler; a first inverter coupled between the output of the inverting amplifier and an input of the photo-coupler; and a second inverter coupled to an output of the photo-coupler, wherein, in operation, the second inverter outputs the reference signal.

In an embodiment, a system comprises: an electronic apparatus; and a position indicator including: a first electrode, which, in operation, receives an input signal from the electronic apparatus and transmits a reference signal; an inverting amplifier having an input coupled to the first electrode, wherein the inverting amplifier, in operation, inverts and amplifies the input signal; and electrical isolation circuitry having an input coupled to an output of the inverting amplifier, wherein the electrical isolation circuitry, in operation, generates the reference signal based on the inverted and amplified input signal. In an embodiment, the inverting amplifier comprises: an operational amplifier having an inverting input terminal, a non-inverting input terminal and an output terminal; a first resistance element coupled between the first electrode and the inverting input terminal; and a second resistance element coupled between the output terminal and the inverting input terminal, the electrical isolation circuitry comprises: a photo-coupler; a first inverter coupled between the output terminal of the operational amplifier and an input of the photo-coupler; and a second inverter having an input coupled to an output of the photo-coupler, and the position indicator includes: a first power supply bus coupled to a phototransistor of the photo-coupler and the second inverter; and a second power supply bus coupled to a light emitting diode of the photo-coupler, the first inverter and the inverting amplifier; and a biasing circuit coupled between an output of the second inverter and the non-inverting input terminal of the operational amplifier, wherein the output of the second inverter is coupled to a low-side of the second power supply bus. In an embodiment, the position indicator comprises a second electrode coupled to the low-side of the second power supply bus.

In an embodiment, a method comprises: receiving, by a position indicator, a signal transmitted by a capacitive touch panel; generating, using an electrical isolation circuit of the position indicator, a reference signal based on the received signal; and transmitting, by the position indicator, the reference signal to the capacitive touch panel. In an embodiment, the position indicator comprises one or more electrodes; the signal transmitted by the capacitive touch panel is received by at least one of the one or more electrodes; and the reference signal is transmitted by at least one of the one or more electrodes. In an embodiment, the reference signal has a polarity opposite of a polarity of the received signal.

DETAILED DESCRIPTION

Example embodiments of the present disclosure will hereinafter be described in detail with reference to the accompanying drawings.

Figure 1:
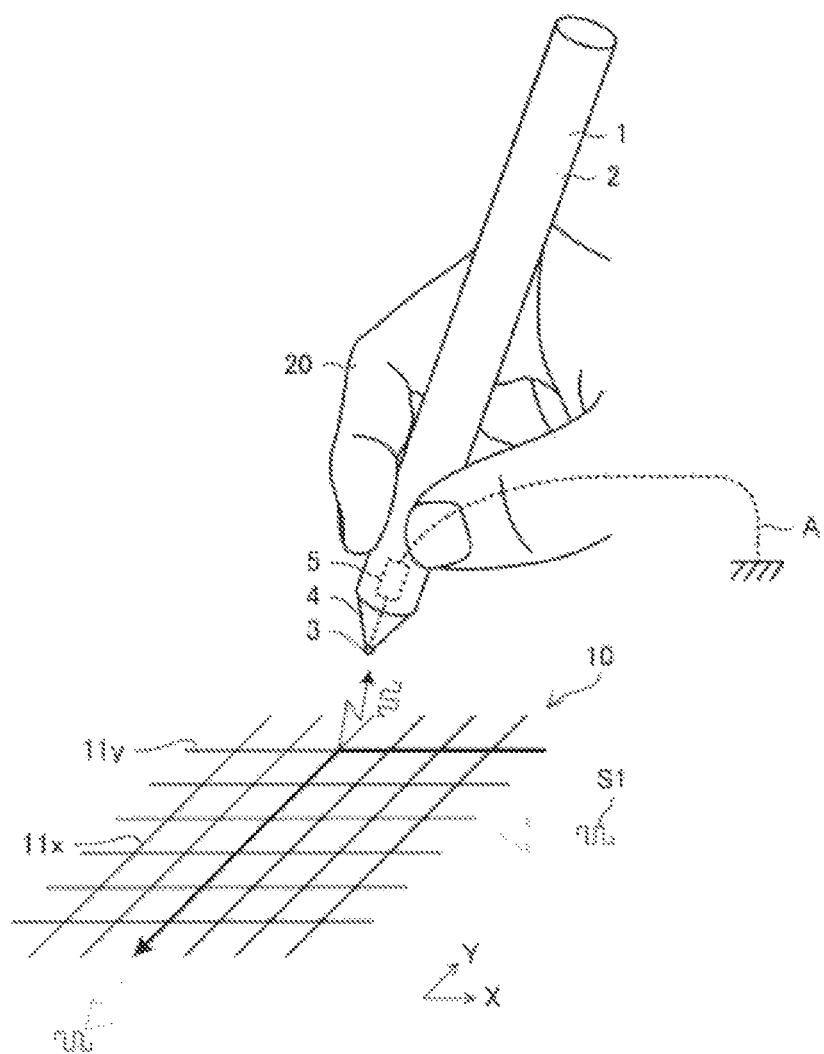
FIG. 1 is a diagram depicting an electronic pen and a touch panel according to an embodiment.

FIG. 1 is a diagram depicting an electronic pen 1 and a touch panel 10 according to a present embodiment. To describe the touch panel 10 first, the touch panel 10 is for example a device comprising an input section of an electronic apparatus such as a tablet terminal or the like. The touch panel 10 is configured to be able to detect the electronic pen 1 by a capacitive system.

Specifically, as depicted in FIG. 1, the touch panel 10 has a configuration in which a plurality of X-electrodes 11x each extending in a Y-direction and arranged at equal intervals in an X-direction and a plurality of Y-electrodes 11y each extending in the X-direction and arranged at equal intervals in the Y-direction are arranged so as to intersect within a touch surface. The touch panel 10 is for example configured to repeat, for all of the Y-electrodes 11y in order, processing of a determined signal S1 to a Y-electrode 11y and extracting the signal S1 from each X-electrode 11x in order.

When the electronic pen 1 approaches the touch panel 10, a capacitance occurs between the electronic pen 1 and an X-electrode 11x and a Y-electrode 11y in the vicinity of the electronic pen 1, and the electronic pen 1 absorbs a part of a current flowing from the Y-electrode 11y to the X-electrode 11x through this capacitance. Then, the amplitude of the signal S1 extracted from the X-electrode 11x is decreased by an amount corresponding to the absorbed current. The touch panel 10 is configured to detect the position of the electronic pen 1 within the touch surface by detecting the change in the amplitude.

As depicted in FIG. 1, the electronic pen 1 includes, as viewed from the outside, a cylindrical casing 2, a pen point portion 3 disposed at a tip of the casing 2, and a base portion 4 having the shape of a circular cone which base portion is disposed between the pen point portion 3 and the casing 2, and is configured to surround the periphery of the pen point portion 3. The pen point portion 3 comprises a conductor. At least a partial region of the casing 2 comprises a conductor. In addition, the pen point portion 3 may be of a desired thickness (e.g., thin). Hence, the electronic pen 1 may be suitable also for drawing a thin line.

A circuit 5 is disposed within the casing 2 of the electronic pen 1. In an embodiment, the circuit 5 facilitates maintaining a high capacitance between the electronic pen 1 and an X-electrode 11x and a Y-electrode 11y within the touch panel 10 as the electronic pen 1 approaches the touch panel 10 when the pen point portion 3 is thin. In an embodiment, the electronic pen 1 may be suitably used as an input pen for a capacitive touch panel, while the electronic pen 1 can reduce power consumption and unnecessary signal radiation. Example configurations of the circuit 5 will be concretely described in the following with reference to a first to a fourth embodiment.

Figure 2:
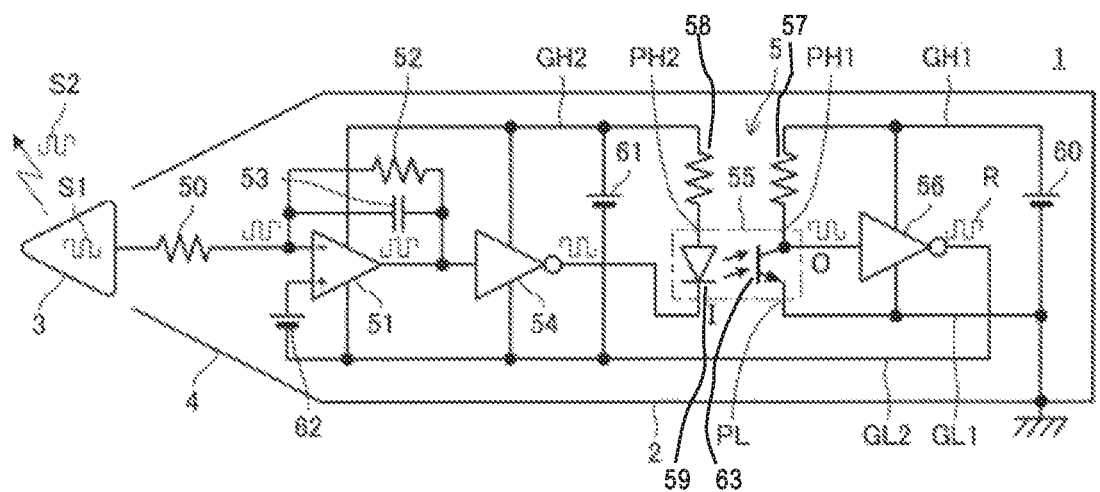
FIG. 2 is a diagram depicting an internal configuration of an electronic pen according to a first embodiment.

FIG. 2 is a diagram depicting an internal configuration of an electronic pen 1 according to a first embodiment. As depicted in FIG. 2, the electronic pen 1 according to the present embodiment includes resistance elements 50 and 52, an operational amplifier 51, a capacitor 53, inverter circuits 54 and 56, a photo-coupler 55, batteries 60 to 62, first and second power supply buses including high-level side power supply wirings GH1 and GH2, and low-level side power supply wirings GL1 and GL2.

The battery 60 (first battery) is a power supply circuit (first power supply circuit) coupled between the low-level side power supply wiring GL1 (first low-level side power supply wiring) and the high-level side power supply wiring GH1 (first high-level side power supply wiring). Hence, a difference corresponding to an electromotive force of the battery 60 occurs between the potential of the low-level side power supply wiring GL1 (first low-level side power supply potential) and the potential of the high-level side power supply wiring GH1 (first high-level side power supply potential). Similarly, the battery 61 (second battery) is a power supply circuit (second power supply circuit) coupled between the low-level side power supply wiring GL2 (second low-level side power supply wiring) and the high-level side power supply wiring GH2 (second high-level side power supply wiring). Hence, a difference corresponding to an electromotive force of the battery 61 occurs between the potential of the low-level side power supply wiring GL2 (second low-level side power supply potential) and the potential of the high-level side power supply wiring GH2 (second high-level side power supply potential).

The low-level side power supply wiring GL1 is coupled to the conductor part of the casing 2. The conductor part may be grounded through a human body of a human holding the electronic pen 1. Hence, a ground potential is supplied to the low-level side power supply wiring GL1. On the other hand, the low-level side power supply wiring GL2 is not coupled to the casing 2, but is instead coupled to an output terminal of the inverter circuit 56. An output signal (reference signal R to be described later) of the inverter circuit 56 is thereby supplied to the low-level side power supply wiring GL2.

The low-level side power supply wiring GL1 is also coupled to a low-level side power supply terminal PL of the photo-coupler 55 and a low-level side power supply terminal of the inverter circuit 56. As illustrated, these terminals are directly connected to the casing 2. On the other hand, the high-level side power supply wiring GH1 is coupled to a first high-level side power supply terminal PH1 of the photo-coupler 55 and a high-level side power supply terminal of the inverter circuit 56. Incidentally, as depicted in FIG. 2, a resistance element 57 is inserted between the high-level side power supply wiring GH1 and the first high-level side power supply terminal PH1 of the photo-coupler 55.

The low-level side power supply wiring GL2 is also coupled to a low-level side terminal of the battery 62 and respective low-level side power supply terminals of the operational amplifier 51 and the inverter circuit 54 in addition to the output terminal of the inverter circuit 56 described above. These terminals are therefore supplied with the reference signal R. On the other hand, the high-level side power supply wiring GH2 is coupled to respective high-level side power supply terminals of the operational amplifier 51 and the inverter circuit 54 and a second high-level side power supply terminal PH2 of the photo-coupler 55. Incidentally, as depicted in FIG. 2, a resistance element 58 is inserted between the high-level side power supply wiring GH2 and the second high-level side power supply terminal PH2 of the photo-coupler 55.

The resistance element 50 (first resistance element) has one end coupled to the pen point portion 3 (first electrode), and has another end coupled to an inverting input terminal of the operational amplifier 51. When the pen point portion 3 approaches the touch surface of the touch panel 10 (FIG. 1), the pen point portion 3 receives a signal S1 transmitted by the touch panel 10. The thus received signal S1 is supplied to the inverting input terminal of the operational amplifier 51 via the resistance element 50.

The resistance element 52 (second resistance element) and the capacitor 53 each have one end coupled to the inverting input terminal of the operational amplifier 51, and each have another end coupled to an output terminal of the operational amplifier 51. In operation, the resistance element 52 and the capacitor 53 may have not only a role as elements of an inverting amplifier to be described later but also may have a role of preventing oscillation. In addition, a high-level side terminal of the battery 62 is coupled to a non-inverting input terminal of the operational amplifier 51. In operation of an embodiment, the battery 62 has a role as a bias potential change circuit. Specifically, the battery 62 changes a bias potential of the reference signal R supplied to the low-level side power supply wiring GL2 so that the bias potential aligns with the signal S1 input to the inverting input terminal of the operational amplifier 51, and supplies the reference signal R having the changed bias potential to the non-inverting input terminal of the operational amplifier 51.

The operational amplifier 51 and the resistance elements 50 and 52 function as an inverting amplifier that inverts, amplifies, and outputs the input signal of the operational amplifier 51 (the signal S1 supplied from the resistance element 50 to the inverting input terminal of the operational amplifier 51). The output signal of the inverting amplifier is supplied to an input terminal of the inverter circuit 54.

The inverter circuit 54 is a circuit that inverts the output signal of the inverting amplifier and which supplies the inverted signal to an input terminal I of the photo-coupler 55. The inverter circuit 54 may comprise a digital circuit such for example as a complementary metal-oxide semiconductor (CMOS) inverter. However, as with the above-described inverting amplifier including the operational amplifier 51, the inverter circuit 54 may also comprise an operational amplifier.

The photo-coupler 55 includes an input terminal I and an output terminal O isolated from each other. Specifically, as depicted in FIG. 2, in addition to the input terminal I and the output terminal O, the photo-coupler 55 has the first high-level side power supply terminal PH1, the second high-level side power supply terminal PH2, and the low-level side power supply terminal PL. A light emitting diode 59 is coupled between the second high-level side power supply terminal PH2 and the input terminal I. A phototransistor 63 is coupled between the first high-level side power supply terminal PH1 and the low-level side power supply terminal PL. The light emitting diode 59 has an anode coupled to the second high-level side power supply terminal PH2, and has a cathode coupled to the input terminal I. The phototransistor 63 has a collector coupled to the first high-level side power supply terminal PH1, and has an emitter coupled to the low-level side power supply terminal PL. The output terminal O is coupled to the collector of the phototransistor in common with the first high-level side power supply terminal PH1.

The operation of the photo-coupler 55 will be described. When a signal is input to the input terminal I, the light emitting diode blinks according to the potential of the signal. When this blinking is input to the phototransistor, the phototransistor generates a signal corresponding to the blinking. This signal is output from the output terminal O. The photo-coupler 55 thus outputs the output signal corresponding to the input signal. Incidentally, the polarity of the output signal of the photo-coupler 55 in the present embodiment as illustrated is the same as the polarity of the input signal. However, the photo-coupler 55 may also be configured such that the polarity of the output signal of the photo-coupler 55 is opposite to the polarity of the input signal.

As described above, the first high-level side power supply terminal PH1 of the photo-coupler 55 is coupled to the high-level side power supply wiring GH1 via the resistance element 57. The second high-level side power supply terminal PH2 is coupled to the high-level side power supply wiring GH2 via the resistance element 58. The low-level side power supply terminal PL is coupled to the low-level side power supply wiring GL1. The input terminal I is coupled to an output terminal of the inverter circuit 54. The output terminal O is coupled to an input terminal of the inverter circuit 56. In operation, the photo-coupler 55 functions as an isolation circuit that isolates the low-level side power supply wiring GL1 and the high-level side power supply wiring GH1 from the low-level side power supply wiring GL2 and the high-level side power supply wiring GH2.

Here, a noise component of the signal input to the input terminal I of the photo-coupler 55 which noise component is so minute as to be unable to drive the light emitting diode does not appear in the signal output from the output terminal O. This means that the photo-coupler 55 may function as a noise filter. This function makes the output signal of the photo-coupler 55 a clear signal from which noise is cut off as compared with the input signal. The cut-off noise may include noise added by the operational amplifier 51 and the inverter circuit 54 in a process of transmission of the signal S1. Hence, the output signal of the photo-coupler 55 may be a signal from which effects of such noise are removed.

The inverter circuit 56 generates the reference signal R by inverting the output signal of the photo-coupler 55, and supplies the reference signal R to the low-level side power supply wiring GL2. The thus generated reference signal R is based on the signal S1 received by the pen point portion 3 and thereafter passed through the inverting amplifier including the operational amplifier 51 and the photo-coupler 55, and has a polarity opposite from that of the signal S1. As in the inverter circuit 54, a digital circuit such as a CMOS inverter may be employed as the inverter circuit 56. However, as in the inverter circuit 54, the inverter circuit 56 may also comprise an operational amplifier.

Directing attention to the operational amplifier 51 again, the operational amplifier 51 comprises an inverting amplifier, and is configured to receive the signal S1 at the inverting input terminal and receive the inverted signal of the signal S1 at the non-inverting input terminal. Thus, due to virtual short-circuiting of the inverting amplifier, as depicted in FIG. 2, the inverted signal of the signal S1 appears at the inverting input terminal of the operational amplifier 51. This inverted signal is radiated through the pen point portion 3 as signal S2, and is received by the X-electrode 11x and the Y-electrode 11y of the touch panel 10 depicted in FIG. 1. This radiation of the inverted signal as signal S2 plays a similar role as the signal S2 depicted in FIG. 6, and may be equivalent to providing a high capacitance as compared with a case where there is no radiation of the signal S2 between the X-electrode 11x and the Y-electrode 11y and the pen point portion 3. Hence, an embodiment facilitates providing an electronic pen 1 which may be suitably used as an input pen for the capacitive touch panel 10 though the pen point portion 3 is formed so as to be thin.

Figure 6:
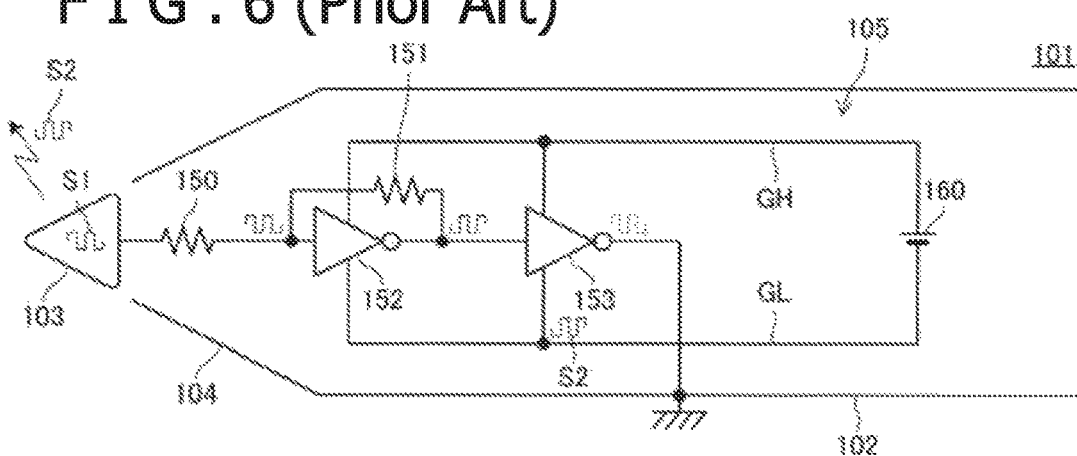
FIG. 6 is a diagram depicting an internal configuration of an electronic pen according to the background art.

Then, unlike the electronic pen 101 depicted in FIG. 6, the electronic pen 1 of FIG. 2 does not need to swing the potential of the whole of the circuit 5 in the process of radiating the signal S2. That is, it is not necessary to fix the potential of the output terminal of the inverter circuit 56 at a ground potential, swing the potential of the whole of the circuit 5 using a reaction when the inverter circuit 56 tries to output a signal, and generate the signal S2. Hence, the inverter circuit 56 does not need to be supplied with a particularly high power. The electronic pen 1 of FIG. 2 may therefore reduce power consumption as compared with the electronic pen 101 depicted in FIG. 6.

In addition, in the electronic pen 1, the reference signal R is supplied to the low-level side power supply wiring GL2. However, because the photo-coupler 55 isolates the low-level side power supply wirings GL1 and GL2 from each other, the low-level side power supply wiring GL1 can be grounded by being coupled to the casing 2, as also depicted in FIG. 2. Hence, even when the electronic pen 1 is not held by a human and the casing 2 is electrically floating, the radiation of an unnecessary signal to the outside from the casing 2 as in the case of the electronic pen 101 depicted in FIG. 6 may be prevented.

As described above, according to the electronic pen 1 according to the present embodiment, a high capacitance may be provided between the X-electrode 11x and the Y-electrode 11y within the touch panel 10 and the pen point portion 3 though the pen point portion 3 is formed so as to be thin. As a result, the electronic pen 1 of an embodiment may be suitable for use as an input pen for the capacitive touch panel 10. In addition, reductions in power consumption and unnecessary signal radiation may be realized.

Incidentally, as described above, the photo-coupler 55 also may function as a noise filter, which may facilitate reducing noise mixed in from the pen point portion 3 as compared with conventional electronic pens. This may also contribute to the reduction in unnecessary signal radiation.

Figure 3:
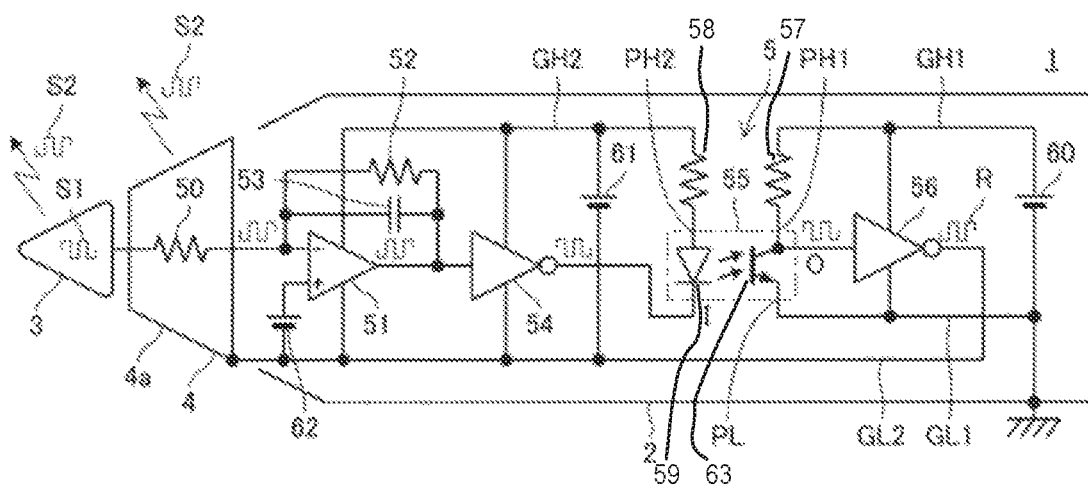
FIG. 3 is a diagram depicting an internal configuration of an electronic pen according to a second embodiment.

Next, FIG. 3 is a diagram depicting an internal configuration of an electronic pen 1 according to a second embodiment. The present embodiment is different from the first embodiment in that the base portion 4 comprises an electrode 4a and the reference signal R is supplied also to the electrode 4a. The second embodiment is otherwise similar to the first embodiment. Therefore, the same elements as in the first embodiment are identified by the same reference symbols as in the first embodiment, and the following description will be made centering on differences from the first embodiment.

As depicted in FIG. 3, an electronic pen 1 according to the present embodiment includes an electrode 4a in a base portion 4. The electrode 4a may cover the entire periphery of a part of the base portion 4 which part is near a pen point portion 3. Covering the entire periphery may provide an effect of the present embodiment which effect will be described later irrespective of the orientation of the electronic pen 1. However, the configuration of the electrode 4a is not limited to a configuration covering the entire periphery of the base portion 4.

As depicted in FIG. 3, the electrode 4a is coupled to a low-level side power supply wiring GL2. A reference signal R is supplied also to the electrode 4a. The signal S2 is thus radiated also from the electrode 4a to the touch panel 10 in the present embodiment. The present embodiment therefore facilitates supplying a stronger signal S2 than in the first embodiment to the touch panel 10.

As described above, the electronic pen 1 according to the present embodiment facilitates supplying signal S2 stronger than in the first embodiment to the touch panel 10. This is equivalent to providing an even higher capacitance than in the first embodiment between an X-electrode 11x and a Y-electrode 11y and the pen point portion 3, which may be desirable in some embodiments.

Figure 4A:
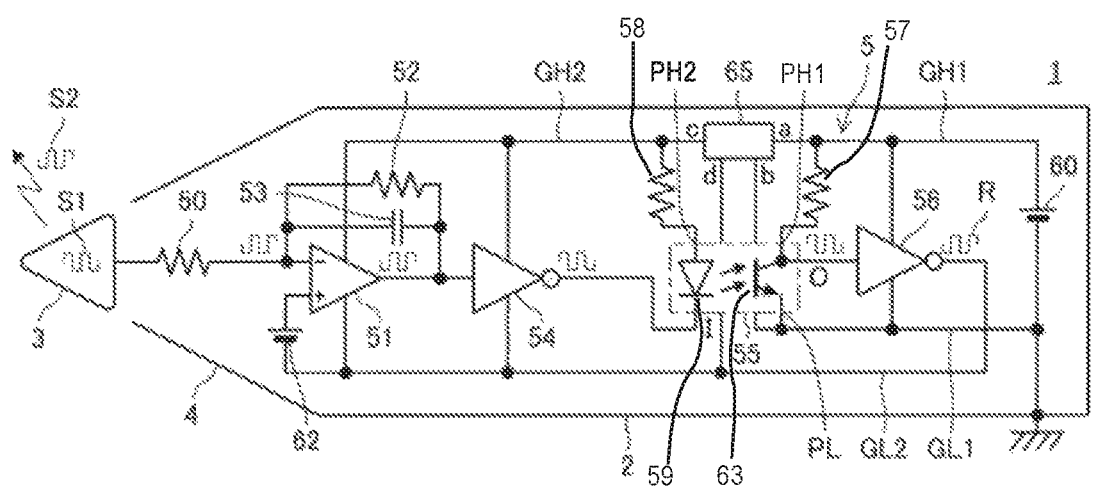
FIG. 4A is a diagram depicting an internal configuration of an electronic pen according to a third embodiment.

Next, FIG. 4A is a diagram depicting an internal configuration of an electronic pen 1 according to a third embodiment. The present embodiment is different from the first embodiment in that a DC-to-DC converter 65 is provided in place of the battery 61. The third embodiment is otherwise similar to the first embodiment. Therefore, the same elements as in the first embodiment are identified by the same reference symbols as in the first embodiment, and the following description will be made centering on differences from the first embodiment.

As depicted in FIG. 4A, the electronic pen 1 according to the present embodiment does not include the battery 61 depicted in FIG. 2, but instead includes an isolated DC-to-DC converter 65. The DC-to-DC converter 65 has four terminals a to d, which are coupled to a high-level side power supply wiring GH1, a low-level side power supply wiring GL1, a high-level side power supply wiring GH2, and a low-level side power supply wiring GL2, respectively.

Figure 4B:
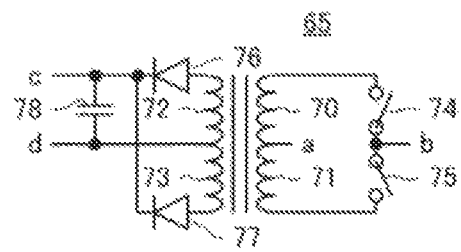
FIG. 4B is a diagram depicting an example internal circuit of a direct current-to-direct current (DC-to-DC) converter depicted in FIG. 4A.

FIG. 4B is a diagram depicting an example internal circuit of the DC-to-DC converter 65. As depicted in FIG. 4B, the DC-to-DC converter 65 includes inductors 70 to 73, switches 74 and 75, diodes 76 and 77, and a capacitor 78. The inductor 70 has one end coupled to one end of the switch 74, and has another end coupled to one end of the inductor 71. Another end of the inductor 71 is coupled to one end of the switch 75. In addition, the inductor 72 has one end coupled to an anode of the diode 76, and has another end coupled to one end of the inductor 73. Another end of the inductor 73 is coupled to an anode of the diode 77. The capacitor 78 has one end commonly coupled to respective cathodes of the diodes 76 and 77, and has another end coupled to the other end of the inductor 72 (one end of the inductor 73). The inductors 70 and 71 and the inductors 72 and 73 form magnetic coupling as depicted in FIG. 4B, and comprise a transformer. By having this transformer, the DC-to-DC converter 65 is an isolated DC-to-DC converter in which an input side and an output side are electrically insulated from each other.

The terminal a of the DC-to-DC converter 65 is coupled to the other end of the inductor 70 (one end of the inductor 71). The terminal b is commonly coupled to respective other ends of the switches 74 and 75. The terminal c is coupled to the one end of the capacitor 78 (respective cathodes of the diodes 76 and 77). The terminal d is coupled to the other end of the capacitor 78 (the other end of the inductor 72 and the one end of the inductor 73).

A control circuit not depicted in the figures controls the DC-to-DC converter 65 so as to periodically turn on one of the switches 74 and 75 and turn off the other. In an embodiment, when the switch 74 is turned on, a current flows through the inductors 70 and 72, and this current charges the capacitor 78. A voltage across the thus charged capacitor 78 is supplied to the high-level side power supply wiring GH2 and the low-level side power supply wiring GL2 via the terminals c and d. When the switch 75 is turned on, a current flows through the inductors 71 and 73, and this current charges the capacitor 78. A voltage across the thus charged capacitor 78 is supplied to the high-level side power supply wiring GH2 and the low-level side power supply wiring GL2 via the terminals c and d. By repeating such operation, the DC-to-DC converter 65 functions as a power supply circuit (second power supply circuit) that supplies power supplied from a battery 60 to the high-level side power supply wiring GH2 and the low-level side power supply wiring GL2 via the transformer comprising the inductors 70 to 73.

As described above, even without the battery 61, the electronic pen 1 according to the present embodiment can supply a power supply voltage to the high-level side power supply wiring GH2 and the low-level side power supply wiring GL2 while maintaining a state in which the high-level side power supply wiring GH2 and the low-level side power supply wiring GL2 are isolated from the high-level side power supply wiring GH1 and the low-level side power supply wiring GL1. Hence, the number of batteries may be reduced as compared with the first embodiment.

Figure 5A:
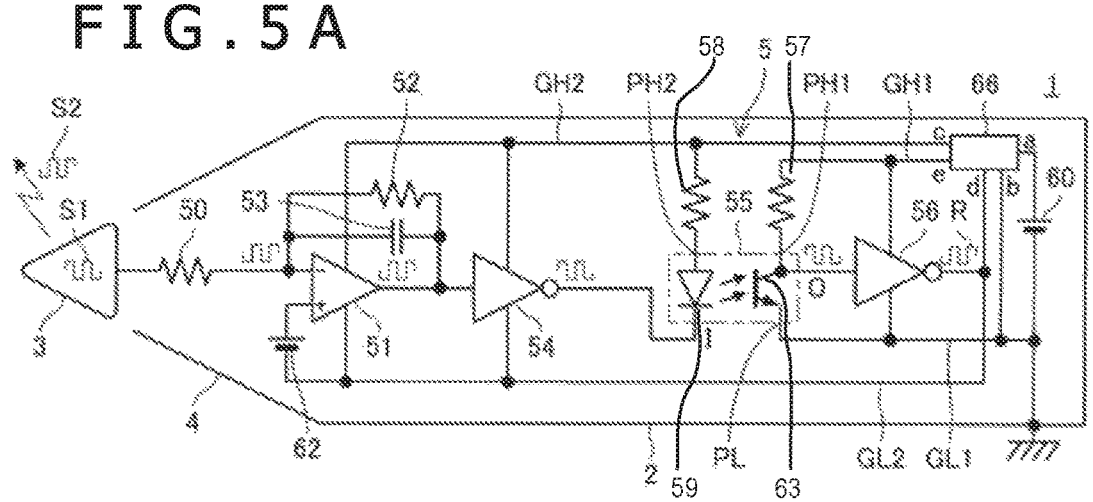
FIG. 5A is a diagram depicting an internal configuration of an electronic pen according to a fourth embodiment.

Next, FIG. 5A is a diagram depicting an internal configuration of an electronic pen 1 according to a fourth embodiment. The present embodiment is different from the third embodiment in that a DC-to-DC converter 66 is provided in place of the DC-to-DC converter 65. The fourth embodiment is otherwise similar to the third embodiment. Therefore, the same elements as in the third embodiment are identified by the same reference symbols as in the third embodiment, and the following description will be made centering on differences from the third embodiment.

As depicted in FIG. 5A, the electronic pen 1 according to the present embodiment includes an isolated DC-to-DC converter 66 in place of the battery 61 depicted in FIG. 2. The DC-to-DC converter 66 has five terminals a to e, which are coupled to a high-level side terminal of a battery 60, a low-level side power supply wiring GL1, a high-level side power supply wiring GH2, a low-level side power supply wiring GL2, and a high-level side power supply wiring GH1, respectively.

Figure 5B:
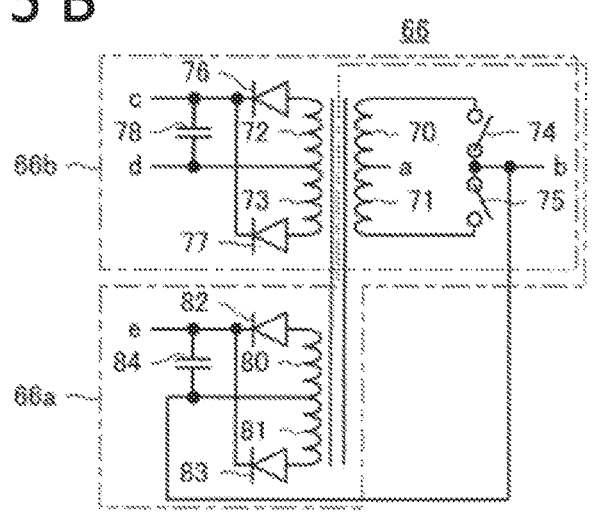
FIG. 5B is a diagram depicting an example internal circuit of a DC-to-DC converter depicted in FIG. 5A.

FIG. 5B is a diagram depicting an example internal circuit of the DC-to-DC converter 66. As depicted in FIG. 5B, the DC-to-DC converter 66 includes two partial circuits 66a and 66b. Of the partial circuits, the partial circuit 66b (second isolated DC-to-DC converter) has a configuration identical to the configuration of the DC-to-DC converter 65 depicted in FIG. 4B. Hence, the partial circuit 66b functions as a power supply circuit (second power supply circuit) that supplies power supplied from the battery 60 to the high-level side power supply wiring GH2 and the low-level side power supply wiring GL2 via a transformer (second transformer) comprising inductors 70 to 73.

On the other hand, the partial circuit 66a (first isolated DC-to-DC converter) shares, with the partial circuit 66b, the inductors 70 and 71 and switches 74 and 75 in the configuration of the partial circuit 66b, and includes inductors 80 and 81, diodes 82 and 83, and a capacitor 84.

The inductor 80 has one end coupled to an anode of the diode 82, and has another end coupled to one end of the inductor 81. Another end of the inductor 81 is coupled to an anode of the diode 83. The capacitor 84 has one end commonly coupled to respective cathodes of the diodes 82 and 83, and has another end coupled to the other end of the inductor 80 (one end of the inductor 81). The inductors 70 and 71 and the inductors 80 and 81 form a magnetic coupling as depicted in FIG. 5B, comprising a transformer.

In the partial circuit 66a of an embodiment, when the switch 74 is turned on, a current flows through the inductors 70 and 80, and this current charges the capacitor 84. A voltage across the thus charged capacitor 84 is supplied to the high-level side power supply wiring GH1 and the low-level side power supply wiring GL1 via the terminals e and b. When the switch 75 is turned on, a current flows through the inductors 71 and 81, and this current charges the capacitor 84. A voltage across the thus charged capacitor 84 is supplied to the high-level side power supply wiring GH2 and the low-level side power supply wiring GL2 via the terminals e and b. By repeating such operation, the partial circuit 66a functions as a power supply circuit (first power supply circuit) that supplies power supplied from the battery 60 to the high-level side power supply wiring GH1 and the low-level side power supply wiring GL1 via a transformer (first transformer) comprising the inductors 70, 71, 80, and 81.

As described above, as with the third embodiment, even without the battery 61, the electronic pen 1 according to the present embodiment may supply a power supply voltage to the high-level side power supply wiring GH2 and the low-level side power supply wiring GL2 while maintaining a state in which the high-level side power supply wiring GH2 and the low-level side power supply wiring GL2 are isolated from the high-level side power supply wiring GH1 and the low-level side power supply wiring GL1. Hence, the number of batteries may be reduced as compared with the first embodiment.

Example embodiments of the present disclosure have been described above. However, the present disclosure is not at all limited to such embodiments. The present disclosure can of course be carried out in various modes without departing from the spirit of the present disclosure.

What is claimed is:

1. A position indicator, comprising:
  a first electrode, which, in operation, receives an input signal and transmits a reference signal;
  an inverting amplifier having an input coupled to the first electrode, wherein the inverting amplifier, in operation, inverts and amplifies the input signal, wherein the inverting amplifier comprises:
    an operational amplifier having an inverting input terminal, a non-inverting input terminal, and an output terminal;
    a first resistance element coupled between the first electrode and the inverting input terminal; and
    a second resistance element coupled between the output terminal and the inverting input terminal;
  electrical isolation circuitry having an input coupled to an output of the inverting amplifier, wherein the electrical isolation circuitry, in operation, generates the reference signal based on the inverted and amplified input signal, wherein the electrical isolation circuitry comprises:
    a photo-coupler;
    a first inverter coupled between the output terminal of the operational amplifier and an input of the photo-coupler; and
    a second inverter having an input coupled to an output of the photo-coupler and an output coupled to an input of the biasing circuit; and
  a biasing circuit coupled between an output of the electrical isolation circuitry and the non-inverting input terminal of the operational amplifier.

2. The position indicator of claim 1, comprising:
  a first power supply bus coupled to a phototransistor of the photo-coupler and the second inverter; and
  a second power supply bus coupled to a light emitting diode of the photo-coupler, the first inverter and the inverting amplifier, wherein an output of the second inverter is coupled to a low-side of the second power supply bus and a second electrode in a body of the position indicator is coupled to a low-side of the first power supply bus.

3. The position indicator of claim 2, comprising:
  a third electrode coupled to the low-side of the second power supply bus.

4. The position indicator according to claim 1, comprising:
  a second electrode positioned adjacent to the first electrode and coupled to power supply wiring.

5. The position indicator according to claim 4, comprising:
  a pen point portion disposed at a tip of a casing; and
  a base portion having a shape of a circular cone, the base portion being disposed between the pen point portion and the casing, and being sized and shaped to surround a periphery of the pen point portion,
  wherein the pen point portion includes the first electrode, and
  the base portion includes the second electrode.

6. The position indicator according to claim 1, comprising:
a first power supply circuit that includes a first battery, and
a second power supply circuit that includes a second battery different from the first battery.

7. A position indicator, comprising:
a first electrode, which, in operation, receives an input signal and transmits a reference signal;
an inverting amplifier having an input coupled to the first electrode, wherein the inverting amplifier, in operation, inverts and amplifies the input signal; and
electrical isolation circuitry having an input coupled to an output of the inverting amplifier, wherein the electrical isolation circuitry, in operation, generates the reference signal based on the inverted and amplified input signal,
wherein the electrical isolation circuitry comprises:
a photo-coupler;
a first inverter coupled between the output of the inverting amplifier and an input of the photo-coupler; and
a second inverter coupled to an output of the photo-coupler, wherein, in operation, the second inverter outputs the reference signal.

8. A system, comprising:
an electronic apparatus; and
a position indicator including:
a first electrode, which, in operation, receives an input signal from the electronic apparatus and transmits a reference signal;
an inverting amplifier having an input coupled to the first electrode, wherein the inverting amplifier, in operation, inverts and amplifies the input signal; and
electrical isolation circuitry having an input coupled to an output of the inverting amplifier, wherein the electrical isolation circuitry, in operation, generates the reference signal based on the inverted and amplified input signal,
wherein the inverting amplifier comprises:
an operational amplifier having an inverting input terminal, a non-inverting input terminal, and an output terminal;
a first resistance element coupled between the first electrode and the inverting input terminal; and
a second resistance element coupled between the output terminal and the inverting input terminal,
wherein the electrical isolation circuitry comprises:
a photo-coupler;
a first inverter coupled between the output terminal of the operational amplifier and an input of the photo-coupler; and
a second inverter having an input coupled to an output of the photo-coupler, and
wherein the position indicator includes:
a first power supply bus coupled to a phototransistor of the photo-coupler and the second inverter; and
a second power supply bus coupled to a light emitting diode of the photo-coupler, the first inverter and the inverting amplifier; and
a biasing circuit coupled between an output of the second inverter and the non-inverting input terminal of the operational amplifier, wherein the output of the second inverter is coupled to a low-side of the second power supply bus.

9. The system of claim 8 wherein the position indicator comprises:
a second electrode coupled to the low-side of the second power supply bus.

* * * * *

UNITED STATES PATENT AND TRADEMARK OFFICE
CERTIFICATE OF CORRECTION

| | |
|---|---|
| PATENT NO. | : 10,429,962 B2 |
| APPLICATION NO. | : 15/280519 |
| DATED | : October 1, 2019 |
| INVENTOR(S) | : Yasuo Oda et al. |

Page 1 of 1

It is certified that error appears in the above-identified patent and that said Letters Patent is hereby corrected as shown below:

On the Title Page

Item (73) Assignee:
"WACON CO., LTD., Saitama (JP)" should read --WACOM CO., LTD., Saitama, (JP)--

Signed and Sealed this
Nineteenth Day of May, 2020

Andrei Iancu
*Director of the United States Patent and Trademark Office*